United States Patent Office 3,478,074
Patented Nov. 11, 1969

3,478,074
PREPARATION OF ORGANOSILICON COMPOUNDS FROM HYDROSILICON COMPOUNDS
George M. Omietanski, Tonawanda, and Thomas C. Williams, Lancaster, N.Y., assignors to Union Carbide Corporation, a corporation of New York
No Drawing. Filed Dec. 29, 1964, Ser. No. 422,008
Int. Cl. C07f 7/08
U.S. Cl. 260—448.2          20 Claims

ABSTRACT OF THE DISCLOSURE

A process for preparing organosilicon compounds comprising reacting a hydrosilicon compound with a positive halogen compound is disclosed.

---

This invention relates in general to a novel process for preparing organosilicon compounds, and more particularly to a process for preparing organosilicon compounds by reacting a hydrosilicon compound with a positive halogen compound in the presence of an acid acceptor.

The term "hydrosilicon compound" is used herein to define a compound containing at least one silanic hydrogen atom, i.e. a hydrogen atom bonded directly to a silicon atom ($\equiv$Si—H). Such compounds include both hydrosilanes and hydrosiloxanes.

A "positive halogen compound" is defined as a compound in which a halogen atom is the positive end of a dipole in a molecule, and in which the residual portion of the molecule is nucleophilic.

It is an object of this invention to prepare organosilicon compounds by reacting a hydrosilicon compound with a positive halogen compound by a reaction which proceeds rapidly at low temperatures, which does not release hydrogen gas as a reaction product, and which is not subject to undesirable side reactions.

These and other objects are accomplished by a novel process for the preparation of organosilicon compounds which comprises reacting a hydrosilicon compound with a positive halogen compound whereby the hydrogen atom of the hydrosilicon compound reacts with the halogen atom of the positive halogen compound to form a hydrogen halide (which is removed thereby) and whereby the hydrosilicon residue is coupled with the nucleophilic residue of the positive halogen compound. Preferably, this reaction is carried out in the presence of an acid acceptor. The preferred process can be illustrated by the following simplified equation which emphasizes the reacting moieties involved in the invention:

In the above formula $\equiv$SiH represents a hydrosilicon compound, $X^+Z^-$ is a positive halogen compound in which X is a halogen atom and Z is a nucleophilic residue, E: is an acid acceptor, $\equiv$SiZ is the organosilicon compound sought to be made, i.e. the reaction product of organosilicon residue and the nucleophilic residue of the positive halogen compound, and E:XH is the product of the hydrogen halide formed during the reaction and the acid acceptor. If the reaction is carried out without the presence of an acid acceptor, then the hydrogen halide (HX) formed will be removed as a gas rather than being coupled to the acid acceptor.

The particular type of organosilicon compound produced will depend upon the type of positive halogen compound used for reaction with the hydrosilicon ($\equiv$SiH) compound. If the positive halogen compound is an alkyl hypohalite (ROX) the reaction product will be an organosilicon ester ($\equiv$SiOR), while if an acyl hypohalite (RCOOX) is used an organosilicon carboxylate ($\equiv$SiOOCR) will result. Similarly, if an N-haloamine ($R_2NX$, RHNK or $RNX_2$) is used as the positive halogen compound then the corresponding organosilicon amine ($\equiv$SiNR$_2$, $\equiv$SiNHR, or ($\equiv$Si)$_2$NR) will be produced. The positive halogen compound may also be an N-haloamide (RCONHX). Reaction thereof with an $\equiv$SiH compound will produce an organosilicon amide ($\equiv$SiNHCOR).

Positive halogen compounds, as noted before, are defined as materials in which the halogen is the positive and of a dipole in a molecule in which the remainder of the molecule is a nucleophile. Positive halogen compounds which are useful in the present invention include, for example, alkyl hypohalites, e.g. t-butyl hypochlorite; acyl hypohalites, e.g. acetyl hypobromite; N-haloamines, e.g. N,N-dichloro-t-butyl-amine; N-haloamides, e.g. N,N-dibromobenzenesulfonamide, N,N - dichlorobenzenesulfonamide, N-bromoacetamide, N-chloroacetamide, N-haloimides, e.g. N-chlorophthalimide, N-chlorosuccinimide, N-bromosuccinimide, 1,3-dichloro-5,5-dimethylhydantoin, 1-bromo-s-triazine-2,4,6(3H, 5H)-trione (bromisocyanuric acid); 1-haloalkynes, e.g. 1-bromohex-1-yne; α-halocarbonyl compounds, e.g. 2,2-dibromomalonic ester, 3,3-dichloropentane-2,4-dione; halonitromethanes, e.g. chlorotrinitromethane, dibromodinitromethane; halocyanomethanes, e.g. bromotricyanomethane, halomethanes, e.g. bromotrifluoromethane; haloacylmethanes; activated haloaromatic compounds, e.g. 2,4,6-trinitrochlorobenzene; nitryl halides; sulfenyl halides, e.g. trichloromethanesulfenylchloride.

Other suitable positive halogen compounds are oxyalkylene hypohalites, which are represented by the formula:

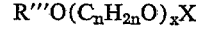

$$R'''O(C_nH_{2n}O)_xX$$

where $R'''$ is X or R (a monovalent hydrocarbon) as defined above, X is a halogen atom having an atomic weight greater than 19, n has a value of 2 to 4, and x has a value of 1 to about 100; preferably n is 2 or 3 and x is 2 to 30. Copolymers where n is a mixture of ethylene and propylene units are also suitable.

The hydrosilicon compounds suitable for use in the present invention includes both hydrosilanes and hydrosiloxanes which contain at least one silanic hydrogen atom. Such compounds may be monomeric or polymeric, linear, branched or cyclic in structure, and may contain from one silicon bonded hydrogen atom to any greater number of silicon bonded hydrogen atoms per molecule. Any one silicon atom may contain from one to four hydrogen atoms bonded directly to it. The remaining valence bonds of the silicon atom (that is, those not bonded either to hydrogen or oxygen atoms) may be satisfied with substituted or unsubstituted, saturated or olefinically unsaturated, aliphatic or aromatic hydrocarbons, or with functional groups. The functional groups may be bonded either directly to the silicon atom or be substituted on the above-mentioned hydrocarbon groups. The functional groups may include, for example, alkoxy, aryloxy, acyloxy, oxirano, cyano, fluoro, amino, amido, hydroxy, carboxy and acyl groups. If the functional group contains an active hydrogen atom, such as an OH or NH$_2$ group, it may take part in the reaction.

The hydrosilanes that are useful in the present invention are represented by the formula:

(A) 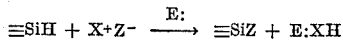 $R_xSiH_{4-x}$ where R is selected from the group consisting of (a) a monovalent hydrocarbon group, (b) a monovalent functionally substituted hydrocarbon group, and (c) a monovalent hydrolyzable functional group, and x represents any whole number of from 0 to 3 inclusive. The monovalent hydrocarbon groups may be the same or different, and may be saturated or olefinically unsaturated, and aliphatic, aromatic or mixtures thereof. The functional groups attached to the Si atom, as well as the functional groups on the hydrocarbon groups, may be any of those mentioned in the paragraph above.

The hydrosiloxanes that are useful in the present invention include those that are composed essentially of groups having the repeating formula:

(B) 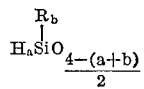

where R is the same as defined above, $a$ has a value or 1 to 3 inclusive, $b$ has a value of 0 to 2 inclusive, and $(a+b)$ has a value of 1 to 3 inclusive.

Hydrosiloxanes that are useful in the present invention also include copolymers composed of units represented by Formula B above and units represented by Formula C below, wherein the ratio of B to C may be from 700:1 to 1:700; preferably from 100:1 to 1:100 and most preferably from 10:1 to 1:10. The molecular weight of such copolymers may range from about 200 for a low viscosity fluid to several million for gums. Formula C is:

C) 

wherein R is defined as above, and $c$ has a value of 0 to 3 inclusive.

Illustrative of the unsubstituted, saturated, aliphatic hydrocarbons or alkyl groups represented by R in Formulas A, B and C above are methyl, ethyl, propyl, butyl, octadecyl, cyclohexyl and cyclopentyl groups. Illustrative of unsaturated aliphatic hydrocarbons or alkenyl groups are vinyl, butenyl, cyclopentenyl and cyclohexenyl. Illustrative of aryl groups are phenyl and naphthyl groups; illustrative of alkaryl groups are tolyl and xylyl; illustrative of aralkyl groups are benzyl and beta-phenylethyl. Suitable illustrative substituents on the hydrocarbon groups are alkoxy aryloxy, acyloxy, oxirano, cyano, fluoro, amino, amido, hydroxy, carboxy and acyl groups.

A preferred class of polymers composed of units represented by Formula B and C above may be represented by the formula:

(D)     $R_3'SiO(R_2'SiO)_x(R'HSiO)_ySiR_3'$ where R' represents any monovalent hydrocarbon group, for example, methyl, ethyl, propyl, cyclohexyl, phenyl, vinyl, tolyl, benzyl. When more than one R' group is attached to any particular silicon atom they may be the same or different groups. Preferably R' is a saturated hydrocarbon group; the methyl group being the most preferred. The value of x can be any average value from 0 to about 10,000, y can be any average value of from 1 to about 10,000, and the ratio of x to y can be from 700:1 to 1:700.

For example, if in Formula D, $x=0$, and $y=1$, and all R's are methyl, the siloxane, hereafter labeled Siloxane I is:

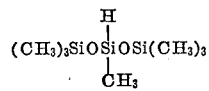

If in Formula D, $x=12.8$, and $y=2.6$ and all R's are methyl, the siloxane, hereafter labeled Siloxane II is:

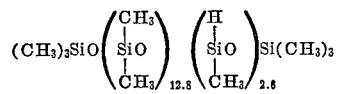

It will be apparent to those skilled in the art that the repeating siloxane units may be varied from those shown in the preferred embodiment of Formula D above, and that equivalent repeating siloxane units may be substituted for those shown. For example, trifunctional repeating units such as $RSiO_{1.5}$ may be used to replace some of the $R_2SiO$ units, and to replace some of the HRSiO units, without departing from the basic concepts of this invention. Furthermore, other types of units such as silcarbane, polysilane and silazane units may also form parts of the copolymer. The methods for preparing such copolymeric polysiloxanes are well known in the art.

Additional illustrative examples of specific hydrosilicon compounds useful in this invention are: $SiH_4$, $Me_3SiH$, $Ph_2SiH_2$, $MePhSiH_2$, $MeEtSiH_2$, $Me_2SiH_2$, $PhSiH_3$, $C_5H_{11}SiH_3$, $Me_2HSiOSiHMe_2$, $SiH(OMe)_3$, $Si(OPh)_3H$, $MeSiH_3$, $Me(CH_2=CHCH_2)_2SiH$, $(C_6H_{11})_3SiH$, $$MeHSi(OEt)_2$$

$Et_3SiH$, $CH_2=CHMe_2SiH$, $MeOCH_2Me_2SiH$, and $$CF_3CH_2CH_2MeSiH_2$$

$Me_3SiOSiMe_2H$, $Me_3SiO(MeHSiO)_3SiMe_3$, $(MeHSiO)_4$, $(Me_3SiO)_3SiH$, $(Me_2SiO)_3(PhHSiO)$, $(EtOMeHSi)_2O$, $$Me_2Si(CH_2)_2SiMeH$$
$$\lfloor_{O}\rfloor$$

$Me_3SiO(H_2SiO)_4SiMe_3$, $[(EtO)_2HSi]_2O$, $(H_2SiO)_4$, $HMe_2SiC_6H_4SiMe_2H$ and the like. The terms Me, Et and Ph are used to designate the methyl, ethyl and phenyl groups respectively.

An acid acceptor such as pyridine, picoline, collidine, quinoline, etc. is preferably used to remove the hydrogen halide formed by the reaction, but is not essential since the hydrogen halide may also be removed by evaporation.

The ratio of reactants, as well as other reaction conditions such as time, temperature, pressure and use of solvent are not critical and may therefore be varied within wide limits.

The positive halogen compound and the hydrosilicon compound can be used in any ratio depending on the effect desired or product sought. A 1:1 ratio of positive halogen atoms to silanic hydrogen atoms is preferred since an excess of the positive halogen compound may lead to side reactions, such as undesirable halogenation. A deficiency of the positive halogen compound results in incomplete reaction. However, this may be desirable as when preparing compounds containing both SiH and SiOR groups. For example, t-BuOMe₂SiOSiMe₂H may be prepared by reacting an equimolar amount of $(HMe_2Si)_2O$ with t-BuOCl.

Any sequence of mixing may be used for the reactants. The positive halogen compound should be added cautiously as the reaction may be highly exothermic. If an acid acceptor, e.g. pyridine, is used it is preferable to avoid prior mixing of it and the positive halogen compound, as premature side reactions may occur.

Inert solvents are not required, but may be used if desired especially for making the reactants compatible and for moderating those reactions which occur very rapidly and exothermically. Any organic solvent which does not contain active hydrogen atoms may be used. Such solvents include aliphatic and aromatic hydrocarbons, chlorinated hydrocarbons, ketones, esters, nitriles and ethers. The preferred solvents are the hydrocarbons, e.g. hexane, benzene and toluene.

The process of this invention may be carried out over a wide range of conditions. It may be accomplished at temperatures ranging from −100° C. to 200° C., the only limit being the decomposition temperature of the reactants, especially the positive halogen compound. Pressures, above, below or at atmospheric may be used. The preferred reaction condition is at atmospheric pressure and at a temperature in the range of from −78° C. to about 50° C.

Reaction time varies depending upon the reactants and proportions thereof, as well as the temperature and pressure used. With t-butyl hypochlorite as the positive halogen compound, the reaction appears to be essentially instantaneous even at −78° C. Some of the other positive halogen compounds, e.g. N-chlorophthalimide, gave a noticeable reaction at room temperature only after several days.

In order to more fully describe the invention, the following examples are given by way of illustration only, and are not intended to limit the scope of the invention.

Example I.—Reaction of t-BuOCl and (HMe₂Si)₂O

In a 1-liter, three-necked flask, fitted with a stirrer, addition funnel, thermometer and gas-bypass tube (to maintain an inert atmosphere) there was placed 33.5 g. of 1,1,3,3-tetramethyldisiloxane and 41 g. of pyridine in 450 ml. of benzene. The flask and accessories were wrapped in aluminum foil to protect the reactants from light. Addition of 54.25 g. of t-butyl hypochlorite over a 90 minute period resulted in an exothermic reaction, which was cooled with an ice bath. The mixture was filtered, and then distilled at 50° C. and 1 mm. Hg to yield 35 g. of 1,3-bis-t-butoxytetramethyldisiloxane, (t-BuOSiMe₂)₂O contaminated with pyridine hydrochloride. The crude product was washed with distilled water, dried over anhydrous sodium sulfate and filtered to give a pure product having the following properties: $n_D^{25}$ 1.3978, $d_{25}^{25}$ 0.8581 g./ml. The infrared analysis was compatible with the assigned structure. This compound is useful as a polymer intermediate for the preparation of film-forming silicone polymers.

Example II.—Reaction of t-BuOCl and (MeHSiO)₃(Me₂SiO)

A solution containing 100.8 g. of a cyclic siloxane of average composition (MeHSiO)₃(Me₂SiO), 200 ml. of benzene, and 104.3 g. of pyridine was cooled to 5 to 15° C. To this solution there was added 143.2 g. of t-butyl hypochlorite over a three hour period. During the reaction, the reactants were protected from light. The mixture was allowed to stand overnight and was washed with water to dissolve the pyridine hydrochloride. The material was filtered and then distilled to give several fractions. All of the fractions were mixtures of cyclic compounds having the formula [Me(t-BuO)SiO]₃(Me₂SiO). Infrared spectra of the fractions showed the absence of silanic hydrogen and the presence of the t-butoxy group in all the fractions. This compound is useful as a low temperature dielectric coolant.

Example III.—Reaction of Me₃SiO(MeHSiO)₂.₆(Me₂SiO)₁₂.₈SiMe₃ and t-BuOCl 54.25 g. of t-butyl hypochlorite was added dropwise over a 20 minute period to a cooled solution (0–10° C.) containing 244 g. of dimethyl-methylhydrosiloxane fluid having the average formula Me₃SiO(MeHSiO)₂.₆(Me₂SiO)₁₂.₈SiMe₃

41 g. pyridine and 450 ml. of benzene. Aluminum foil was used to shield the reactants from light. The mixture was allowed to warm to room temperature, washed with a saturated sodium bicarbonate solution, washed with a saturated sodium chloride solution and then dried with anhydrous sodium sulfate. After sparging with nitrogen at 150–200° C. for four hours, the product was filtered to yield 172 g. of yellow liquid, having a viscosity of 92.5 cstks. at 25° C. and a pour point −102 to −109° F. Infrared spectrum showed the presence of the t-butoxy group indicating that the product has the average structure Me₃SiO[Me(t-BuO)SiO]₂.₆(Me₂SiO)₁₂.₈SiMe₃. This compound is useful as a low temperature dielectric coolant.

Compounds produced in accordance with this invention are useful as low temperature dielectric coolants and lubricants, coating resins for electrical components, water repellents for textiles and other uses which will be obvious to those skilled in the art. As will be apparent, the utility of a compound in a specific area will depend upon the silicon functionality and organic substituents of the products.

What is claimed is:

1. A process for preparing organosilicon compounds comprising reacting:
   (1) a hydrosilicon compound with
   (2) a positive halogen compound, wherein the halogen has an atomic weight greater than 19, selected from the group consisting of tertiary alkyl hypohalite, acyl hypohalite, N-haloamine, and N-haloamide,
       whereby the hydrogen atom of the hydrosilicon compound reacts with the halogen atom of the positive halogen compound to form a hydrogen halide, and whereby the hydrosilicon residue is coupled with the nucleophilic residue of the positive halogen compound.

2. The process of claim 1 wherein the reaction is carried out in the presence of an acid acceptor.

3. The process of claim 2 wherein the organosilicon compound produced by said reaction is separated from the remainder of the reaction products.

4. The process of claim 2 wherein the hydrosilicon compound is selected from the group consisting of hydrosilanes and hydrosiloxanes.

5. The process of claim 4 wherein the hydrosilane is represented by the formula:

$$R_xSiH_{4-x}$$

where R is selected from the group consisting of (a) a monovalent hydrocarbon group, (b) a monovalent functionally substituted hydrocarbon group and (c) a monovalent hydrolyzable functional group, and x represents any whole number from 0 to 3 inclusive.

6. The process of claim 4 wherein the hydrosiloxanes are represented by the repeating formula:

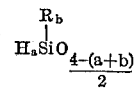

where R is selected from the group consisting of (a) a hydrocarbon group, (b) a functionally substituted hydrocarbon group and (c) a functional group, a has a value of 1 to 3 inclusive, b has a value of 0 to 2 inclusive, and (a+b) has a value of 1 to 3 inclusive.

7. The process of claim 4 wherein the hydrosiloxanes are represented by the formula:

$$R_3'SiO(R_2'SiO)_x(R'HSiO)_ySiR_3'$$

where R' is a monovalent hydrocarbon group, x has any average value from 0 to about 10,000, y has any average value from 1 to about 10,000, and the ratio of x to y is from 700:1 to 1:700.

8. The process of claim 7 wherein R' is a saturated hydrocarbon group.

9. The process of claim 7 wherein all the R' groups are methyl groups.

10. The process of claim 2 wherein the hydrosilicon compound is:

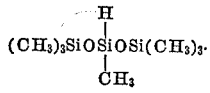

11. The process of claim 2 wherein the hydrosilicon compound is:

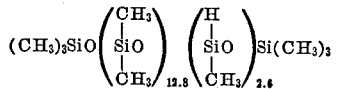

12. The process of claim 2 wherein the acid acceptor is selected from the group consisting of pyridine, picoline, collidine and quinoline.

13. The process of claim 2 wherein the acid acceptor is pyridine.

14. The process of claim 2 wherein the reaction is carried out in the presence of an inert organic solvent which is free of active hydrogen atoms.

15. The process of claim 14 wherein the inert solvent is selected from the group consisting of aliphatic hydrocarbons, aromatic hydrocarbons, halogenated hydrocarbons, ketones, esters, nitriles and ethers.

16. The process of claim 15 wherein the inert organic solvent is a hydrocarbon.

17. The process of claim 2 wherein the reaction is carried out at a temperature ranging from −100 to 200° C.

18. The process of claim 2 wherein the reaction is carried out at a temperature ranging from −78 to 50° C.

19. A process for preparing organosilicon compounds comprising reacting:
(1) a hydrosilicon compound represented by the formula:

$$R'SiO(R_2'SiO)_x(R'HSiO)_y SiR_3'$$

where R' is a monovalent saturated hydrocarbon group, $x$ has any average value from 0 to about 10,000, $y$ has any average value from 1 to about 10,000, and the ratio of $x$ to $y$ is from 700:1 to 1:700, with (2) a tertiary alkyl hypochloriate, in the presence of
(3) pyridine.

20. A process for preparing organosilicon compounds comprising reacting:
(1) a hydrosilicon compound with
(2) tertiary butyl hypochlorite, wherein the reaction is carried out in the presence of an acid acceptor, and whereby the hydrogen atom of the hydrosilicon compound reacts with the chlorine atom of the tertiary butyl hypochlorite compound to form hydrogen chloride, and whereby the hydrosilicon residue is coupled with the nucleophilic residue of the tertiary butyl hypochlorite compound.

No references cited.

TOBIAS E. LEVOW, Primary Examiner
J. P. PODGORSKI, Assistant Examiner

U.S. Cl. X.R.
260—46.5, 248, 326, 348, 448.8